Figure 1:
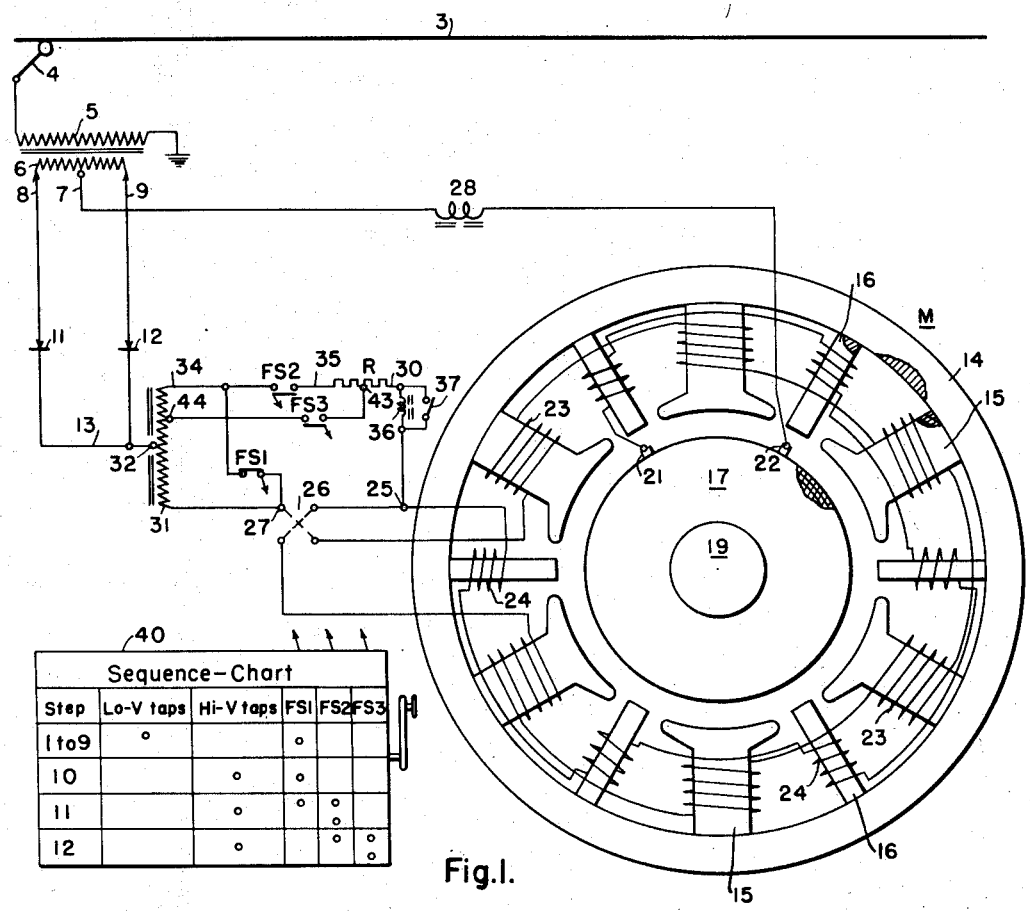

Sept. 22, 1953     L. J. HIBBARD     2,653,287

RECTIFIER-POWERED VEHICLE

Filed May 26, 1951

WITNESSES:

INVENTOR
Lloyd J. Hibbard,
BY
ATTORNEY

Patented Sept. 22, 1953

2,653,287

UNITED STATES PATENT OFFICE 2,653,287

RECTIFIER-POWERED VEHICLE

Lloyd J. Hibbard, Pittsburgh, Pa., assignor to Westinghouse Electric Corporation, East Pittsburgh, Pa., a corporation of Pennsylvania Application May 26, 1951, Serial No. 228,426

6 Claims. (Cl. 318—249)

My invention relates to pulsating-current motors such as are used in rectifier-powered vehicles, and my invention has primarily to do with the use of a mutual-inductance load-dividing means which is operative, at times, to cause the flow of a substantial portion of the ripple of the rectifier-supplied pulsating direct-current to flow in a shunt which is connected across at least some portion of the rectifier-powered motor-circuit. More particularly, my invention relates to the use of a mutual-inductance load-dividing means in connection with a field-weakening shunt, for obtaining a reduced-field operation of a series direct-current motor which is operating on a pulsating-current source which has a considerable ripple superimposed upon the direct current.

It is extremely desirable to operate a series pulsating-current motor, at times, under weakened-field conditions, as is well-known in connection with direct-current motors which operate on direct-current systems without any substantial ripple. There are two ways, in general, for producing a reduced-field operation: one way is by means of taps brought out from the main field-windings, so that the number of field-turns can be reduced; and the other way is by means of a field-shunt. My present invention has particular reference to a type of railway-motor in which the available end-winding space is so cramped that it just simply is not feasible to bring out the tap-connections which are necessary for field-tapping. A common type of such a direct-current motor is a six-pole motor, and if field-taps were brought out from each of the main poles of such a motor, such a procedure would entail the use of heavily insulated field-tapping conductors running from pole to pole of the main field poles, across the interpole winding-space, and into the individual main series field-windings on the six main field-poles, and the motor-design in which my present invention is particularly applicable is such that there is not room for such connections.

My present invention is applicable mainly to reduced-field motor-operation which is obtained by means of field-shunts which are connected in shunt-circuit relation to the series main-field windings. While such field-shunts have been quite successful on series direct-current motors which operate on direct-current systems having substantially no ripple, they have been subject to serious undesirable features, when used in connection with pulsating-current motors, and more particularly series motors having main field-poles and interpoles, and windings on each.

My invention is an improvement over the apparatus described and claimed in my copending application Serial No. 120,331, filed October 8, 1949, for Inductive-Interference Preventive-Means, wherein was shown a railway vehicle using rectifier-powered direct-current traction-motors, deriving their power from an alternating-current trolley which was subject to inductive interference with a neighboring communication-system. As stated in the aforesaid copending application, it is extremely desirable to use a rectifier-powered direct-current circuit having sufficiently little inductance to permit the flow of a ripple of the order of 30 or 35%, more or less, defining the ripple-percentage as an expression of the fraction obtained by dividing the peak-value of the ripple by the average value of the direct-current, or the value of the direct-current component. By using such a relatively large ripple, it was possible to assist materially in reducing the magnitude of the interference-provoking harmonics in the alternating-current supply-system. This large ripple consists essentially or predominantly of the second harmonic of the line-frequency, as the higher-order even harmonics are of diminishing magnitudes to begin with, and are more and more effectively blocked by the impedance of the direct-current load-circuit, as the harmonic-order increases.

The reasons for the difficulties which have been experienced with reduced-field operation of pulsating-current series traction-motors are not altogether clear. In searching for the source of the troubles, it was soon discovered that the impedance of the series main-field windings of the motor varied considerably in accordance with the motor-current, varying from a rather high impedance-value at small motor-currents, to a considerably lower impedance-value under full-load conditions. The behavior of the field-shunt, therefore, was erratic, depending upon the amount of current being drawn by the motor, at any instant. I believe that it is desirable for the weakened-field operating-conditions to maintain the same proportionate shunting of the direct-current component and the ripple-component of the motor-current, so that the same relative commutating-conditions will be maintained during field-weakened operation as during the full-field operation.

In fact, my present invention is partly predicated upon the discovery that if the motor is designed to have black commutation during full-field operation, black commutation may still be maintained, during weakened-field operation, if the field-shunt is equally effective with respect to both the ripple-component and the steady-state or direct-current component of the motor-current. It is possible that this last statement may involve a slight oversimplification of the problem, as it may be that the problem should be limited to the case of the commonly used commercial types of motors, which are motors having laminated armatures and laminated main poles, and solid frames and solid commutating poles; and it may be that the connection of a shunt across the main field-windings, which are disposed on laminated poles, may, if the shunt has insufficient inductance, cause said main-pole windings to be partially short-circuited with respect to the interpole flux, to the extent that the interpole flux, which returns through the laminated main poles during full-field operation, is forced, during reduced-field operation, to travel around twice as much of the solid frame, so as to find a return-path from one interpole to the next interpole, rather than from the first interpole to the intervening main pole.

These speculative features are not altogether understood, and not altogether determined, even as yet, after considerable experimentation. My work has proceeded far enough to demonstrate clearly, however, that if the motor is so designed as to have black commutation during full-field operation, it will continue to have black commutation during reduced-field operation if I approximately maintain the proportionate divisions of the direct-current component and the ripple-current component of the currents, in the field-shunt and in the series main-field winding.

The foregoing discussion has emphasized the importance of obtaining the same proportionate division of the direct current and the ripple, in the field-weakening shunt, notwithstanding the fact that the inductive impedance of the main field-windings of the motor is widely variable, in dependence upon the motor-current. The impedance of the inductance-part, in previously used field-shunts for pulsating-current motors, also varies somewhat with the current, but not in the same way as the variation in the field-winding inductance.

There is another advantage of my mutual-inductance load-dividing means, for providing an instrumentality for selectively controlling the division of the alternating-current component, or ripple-component, between the main field-winding and the field-reducing shunt. Heretofore, it has been generally necessary to attempt to make the field-reducing shunt have the same ratio of inductive impedance to resistance as is obtained in the main field-winding circuits, as nearly as was practicable in dealing with a variable field-winding inductance, and with particular attention to the maximum-current conditions, which are usually the most severe conditions. To maintain this supposedly proper ratio of inductance to resistance, in the field-reducing shunt, it has been necessary to use extremely large, and heavy, and expensive choke-coils, which have taken up considerable valuable space which could ill be spared for them, and which have cost a rather considerable amount of money, which is large enough to be noticeable, even in an expensive total locomotive-cost.

In accordance with my invention, I can omit all, or sometimes almost all, of these choke-coils from the field-shunts, thus using only the shunt-resistors which control the division of the direct-current component in the shunt, relegating, to the mutual-inductance load-dividing means, the duty of effecting the proper division of the alternating-current component or ripple of the motor-current. This mutual-inductance load-dividing means is much smaller, and less expensive, than the heretofore-used, imperfectly operating, choke-coils of the previously used field-shunts. It is an important object of my invention, therefore, to use my mutual-inductance load-dividing means in combination with a field-shunt which has a substantially smaller proportion of inductance to resistance than is present in the series main-field winding under some motor-operating conditions.

Other features of my invention have to do with the necessary switching which is involved in the use of my mutual-inductance load-dividing means, in changing over from full-field motor-operating conditions to reduced-field motor-operating conditions. A further detail of my invention relates to means for making it possible to change the amount of the direct-current component which is shunted out of the main field windings, while at the same time making a corresponding change in the mutual-inductance load-dividing means, in order to correspondingly change the division of the alternating-current component or ripple.

Figure 2:
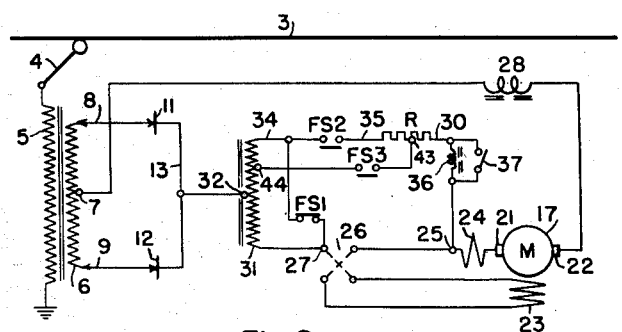

With the foregoing and other objects in view, my invention consists in the systems, structures, combinations, parts, and methods of design and operation, as hereinafter described and claimed, and illustrated in the accompanying drawing, wherein Figure 1 is a diagrammatic view of simplified circuits and apparatus, illustrating my invention in an exemplary form of embodiment, with the motor-structure diagrammatically indicated, and also with a sequence-chart of the pertinent switching-operations, and Fig. 2 is a still more diagrammatic indication of the system, with the motor shown in considerably less detail, and omitting the sequence-chart.

In the drawing, I have shown a single-phase supply-system, as represented by a trolley-wire 3. The illustrated equipment is mounted on a vehicle which derives its power from the trolley-wire, as diagrammatically indicated by a trolley-pole 4 or other current-collecting device. The single-phase power is received at any convenient frequency, such as 25 or 60 cycles, and it is usually stepped down in voltage, by means of a transformer 5, which is illustrated as having a secondary winding 6 having a midpoint-connection 7, and two voltage-changing taps 8 and 9 on opposite sides of the midpoint-connection.

The variable-voltage taps 8 and 9 are connected to the anodes of two rectifiers 11 and 12, as described in my copending application; the cathodes of these two rectifiers being connected to a common cathode-circuit 13, which constitutes the positive pulsating-current supply-terminal.

The pulsating current which is delivered by the rectifiers 11 and 12 is supplied to a series direct-current traction-motor M, which is diagrammatically indicated, in Fig. 1, as being a six-pole motor having a solid frame 14, six laminated main poles 15, six solid interpoles 16, and a rotating armature-member comprising a laminated armature core 17 and a commutator which is diagrammatically represented by the same circle as the armature, in accordance with the usual convention, the armature and commutator being mounted on a shaft 19. It will be understood that the armature 17 carries the armature windings, which are again conventionally illustrated by means of the same circle 17 which represents the core and the commutator. The commutator 17 is engaged by two current-collecting brushes 21 and 22.

The stator member of the motor is provided with series main-field windings 23, and series interpole windings 24, which are disposed on their respective poles in a known manner. Usually, the interpole windings 24 are connected between one of the motor-brushes, such as 21, and an interpole-winding terminal 25, which is brought out from the motor. The main-field windings 23 have their terminals brought out to a reverser 26, which is connected between the interpole-winding terminal 25 and the positive motor-terminal 27, in the illustrated motor.

Somewhere in the motor-circuit, it is usually desirable to include a ripple-reducing choke-coil 28, which is separate from the motor, and which is shown as being connected between the brush 22, which constitutes the negative motor-terminal, and the midpoint-connection 7 of the transformer, which constitutes the negative pulsating-current supply-terminal.

My invention relates to a motor-combination which includes a field-weakening shunt 30, which is usually referred to simply as a field-shunt, this shunt being adapted to be connected in shunt-circuit relation across the main field-windings 23 for the purpose of providing reduced-field motor-operation.

Associated with the field-shunt 30, and at times cooperating therewith, I also provide a mutual-inductance load-dividing means, which is shown in the form of a balance-coil 31, having a midpoint-connection 32, or other intermediate tap-point, which is directly connected to the positive pulsating-current supply-terminal 13. The balance-coil 31 has two terminals, one of which is permanently connected to the positive motor-terminal 27, while the other balance-coil terminal 34 is connected to two field-switch contacts FS1 and FS2. The second terminal of the first field-switch contact FS1 is permanently connected to the positive-motor terminal 27. The second terminal of the second field-switch contact FS2 is permanently connected to one terminal 35 of the field-shunt 30, the other terminal of the field-shunt being permanently connected to the interpole-winding terminal 25.

Heretofore, any field-weakening shunt or field-shunt which was used in connection with my rectifier-powered vehicle, in which there is a very substantial ripple in the direct-current circuit, has included both a resistance and a large inductance (not shown), in an effort to make the field-shunt divide both the non-fluctuating direct-current component and the alternating-current ripple-component of the motor-current in approximately equal proportions. As previously intimated, this objective has been impossible of perfect attainment heretofore, because of the fact that the inductances of the field-coil and the shunt do not vary equally at different load-currents, and possibly also, to a much smaller extent, at different temperatures. Moreover, the previously used large-size choke-coils (not shown), which were included as the inductance-portion of the field-shunt, as previously designed, have been quite large, quite heavy, and quite expensive.

In accordance with my present invention, I am enabled to use a field-shunt 30 which has a substantially smaller proportion of inductance to resistance, than is present in the series main-field winding 23, at least under some motor-operating conditions. The point is, that I do not provide a field-shunt which is capable, by itself, of effecting a proportionate division of both the direct-current component and the alternating-current or ripple-component of the motor-current during all conditions of operation. It is possible to use substantially no inductance at all, in my field-shunt 30, so that this shunt consists only of a resistor R, and whatever inductance is inherent in the resistor R and in the terminal-leads of the shunt, which is usually altogether negligible, being practically zero. Usually, however, it is more economical to use a small inductance 36 in the field-shunt 30, but this small inductance may also be omitted altogether, as indicated by a short-circuiting switch 37 which I have shown in the drawing.

During the operation of the pulsating-current motor M, there are times when the motor is operated with a full field, and other times when the motor is operated with a reduced field. The motor-operation is controlled by some suitable controlling-means, which is diagrammatically represented, in Fig. 1, as a drum-controller 40, which is in turn schematically represented as a sequence-chart in which the closure of the various switch-contacts is indicated by appropriate circles, in accordance with the usual convention. In Fig. 1, I have indicated the physical and electrical relationship between the drum-controller sequence chart 40 and the field-shunt switches which are used in my present invention, by means of arrows which schematically connect the various parts together.

During the operation of the motor M, as indicated in Fig. 1, it is assumed that the motor is initially started, on a low-voltage tap-adjustment of the transformer 5, with a full-field excitation, and that the motor is then accelerated, through any desired number of taps, by the manipulation of the voltage-changing taps 8 and 9, until the motor is operating, say on step 10 of the controller 40, at its full or maximum voltage, and with its full or unshunted field-strength.

During this full-field operation of the motor M, the field-shunt switch-contact FS1 is closed, and the field-shunt switch-contact FS2 is open. Thus, it will be apparent, from the drawing, that both terminals 34 and 27 of the balance-coil 31 are connected together during full-field motor-operation, thus causing the alternating-current or ripple-component of the motor-current to divide equally in the two halves of the balance-coil, so that the alternating-current fluxes of these two halves balance and neutralize each other, so that the balance-coil, under these conditions, offers substantially no impedance to the flow of the total alternating-current component, and develops substantially no alternating-current voltage across the terminals 27 and 34 of the balance-coil 31.

In Fig. 1, a field-weakening operation is obtained on step 11 of the controller 40. In this step, the field-shunting switch-contact FS2 is first closed, and immediately thereafter the previously closed switch-contact FS1 is opened. During the very short transition-period when both switch-contacts FS1 and FS2 are closed, the field-shunt 30 is momentarily connected directly across the conductors 27 and 25, so that this field-shunt 30 is connected directly in shunt-circuit relation across the reverser 26, and hence across the series main-field winding 23, without any means for inductively controlling the relative proportionate divisions of the direct-current and alternating-current components of the motor-current. This transition-period lasts for such a short instant of time, that it is quite unimportant from the standpoint of motor-operation, and this condition is practically instantly changed to a condition to which the switch-contact FS1 is opened and the switch-contact FS2 is closed.

The effect of this switching-operation, as completed on step 11 of the controller 49, is to put the field-shunt 30 in series-circuit relation to one half or branch-circuit of the balance-coil 31, as indicated by the balance-coil terminal 34, while the main-field winding 23 is in series-circuit relation to the other half or branch-circuit of the balance-coil 31, as represented by the balance-coil terminal 27. The balance-coil resistance is so small that it has little, or substantially no, effect upon the division of the direct-current component of current between the main-field winding 23 and the shunt-connected field-shunt 30, respectively, this direct-current division being in inverse proportion to the magnitudes of the field-winding resistance and the shunt-resistance R, respectively.

The balance-coil 31, under these circumstances, operates solely on the alternating-current or ripple-frequency component of the motor-current, and it develops whatever alternating-current terminal-voltage is necessary, across the balance-coil terminals 27 and 34, to cause the alternating-current component to divide, in the two "halves" of the balance-coil 31, in substantially inverse proportion to the turn-numbers of these two balance-coil "halves." Thus, if the shunting resistance R is equal to the field-resistance, so that the direct-current component divides equally between the field and the shunt, then the turn-numbers of the two halves of the balance-coil 31 are substantially equal, so that the alternating-current component will also divide equally between the field 23 and the shunt 30, notwithstanding the fact that the alternating-current impedance of the shunt 30 is not equal to the alternating-current impedance of the field-winding 23, at the dominant ripple-frequency, which is the second harmonic of the line-current frequency.

In some motor-control systems it may be desirable to provide a second field-shunting step, as represented by the controller-step 12 in Fig. 1, wherein the field-strength is still further weakened by reducing the resistance R of the shunt 30. This may be accomplished, in accordance with my present invention, by simultaneously reducing the number of turns in the shunt-energizing "half" or portion of the balance-coil 31, as is indicated by a field-shunt switching-contact FS3 which is connected between an intermediate resistance-tap 43 of the shunt-circuit resistor R, and an intermediate balance-coil tap 44 which is connected at an appropriate point between the balance-coil terminal 34 and the balance-coil midtap 32. Again, in making this change in the field-shunting connections, a momentary open-circuit condition is avoided by first closing the switch-contact FS3, while the switch-contact FS2 is still closed, and then instantly thereafter opening the switch-contact FS2. During the momentary transition-period when both of the switch-contacts FS2 and FS3 are closed, a portion of the resistance R is connected across the balance-coil turns which are included between the terminal 34 and the tap 44, which does no harm at all, and almost instantly thereafter, the switching-contact FS2 is opened, so that, in the full controller-position, on step 12, only a portion of the shunt-resistor R is included in circuit, and only a corresponding portion of the balance-coil turns are included, between the taps 32 and 34, in series with the field-shunt 30. In this way, the balance-coil 30 can still cause the alternating-current component to divide, between the field-winding 23 and the shunt 30, in substantially the same proportions as the division of the direct-current component.

Throughout all of the motor-operation, it will be understood that the ripple-reducing choke-coil 28 effects some smoothing out of the ripples which would otherwise be present in the pulsating-current circuit from 13 to 7, but this ripple-reducing choke-coil is normally small enough so that the ripple-percentage is of the order of 30 or 35%, which is considerably larger than the ripple-percentages of 15% or less, which are present in other commonly used rectifier-systems.

Whatever the ripple-percentage may be, in the current which actually flows through the motor-windings, it is desirable that this ripple shall be divided in substantially the same proportionate division as the direct-current component, so that, when the main field-flux is weakened, by dividing out a certain porportion of the direct-current component of the motor-current, out of the main-field winding 23, through the action of the field-shunt 30, then substantially the same proportion of the ripple-contact should also be divided out. It will be understood, as previously explained, that the predominant, and only significant, ripple-component is usually the second harmonic of the line-frequency. However, whatever may be the ripple-frequency, my balance-coil 31 operates as a mutual-inductive load-dividing means, which is selectively operative on only the alternating-current component of the motor-current, regardless of the frequency or frequencies of that alternating-current component, so as to cause the flow of a substantial portion, or any desired portion, of the ripple, in the field-shunting circuit 30.

It will be understood that the balance-coil 31 is small, as compared to the heavy shunt-resistor R, or as compared to the still heavier shunt-inductances (not shown) which were previously used in the field-shunts of pulsating-current motors, to compensate for the fact that the motor field-winding 23 has a rather large inductance, which is several times larger than the resistance of said motor field-winding. My invention contemplates that sometimes a small inductance 36 might be included in the field-shunting circuit 30, either by being incorporated in the shunt-circuit resistance R, or otherwise, the only absolutely essential fact being that the field-shunt shall not always have the same relative proportions of inductance and resistance as are present in the field-winding which is being shunted, the discrepancy being taken care of by the ripple-dividing control which is exercised by the balance-coil 31.

Of course, the more perfectly the division of the alternating-current and direct-current components is controlled by the proportionate amounts of inductance and resistance in the shunt 30, the smaller will be the burden or duty imposed on the balance-coil, and hence the smaller and less expensive will be the balance-coil, and usually it will be found more economical to use a very small inductance 36 in the shunt-circuit 30, not nearly enough to make the proper proportionate part of the ripple to flow through the series field-winding 23, relegating the duty of ripple-control to the balance-coil 31, which is much lighter in construction, and can be made much less expensively, than the heavy inductance-devices which would otherwise be required in the shunting circuit 30.

Furthermore, altogether aside from considerations of space, weight and cost, my balance-coil 31 produces a much better operation than can be obtained without it, because of the variation in the impedance of inductances at different load-currents which are being carried thereby, having reference to the proper division of both the direct-current component and the alternating-current component of these load-currents.

My Fig. 2 diagram is merely a simplified form of the system which has already been described in connection with Fig. 1, being included in the drawing as shown, more simply and directly, and by a more conventional showing, certain essential features of my invention. Since the same reference-numerals are used in both figures, and since the circuits are the same, it is believed that a further detailed description of Fig. 2 will not be necessary.

While I have described and illustrated my invention is a single exemplary form of embodiment, I wish it to be understood that various changes may be made, by way of the substitution of equivalents, or the addition or omission of parts, without departing from the essential spirit of the invention. I desire, therefore, that the appended claims shall be given the broadest construction consistent with their language.

I claim as my invention:

1. In combination, a direct-current motor-means, a motor-circuit for said motor-means, pulsating-current supply-terminals for said motor-circuit for supplying said motor-circuit with a direct current having a substantial ripple consisting predominantly of a predetermined alternating-current frequency, a shunt including a substantial amount of resistance, a connection-means for, at times, connecting said shunt in shunt-circuit relation to at least some portion of the motor-means, and a mutual-inductance load-dividing means having two branch-circuits in which the mutual inductance tends to maintain a predetermined division of the alternating-current ripple-component of the current in the motor-circuit, said connection-means including means for at such times connecting said load-dividing means with one of said branch-circuits serially including said shunted portion of the motor-means and with the other of said branch-circuits serially including said shunt and connected in shunt-circuit relation to said shunted portion of the motor-means, whereby to cause the flow of a substantial portion of the ripple in said shunt.

2. In combination, a series direct-current motor comprising an armature-winding and serially connected field-windings including a series main-field winding, a motor-circuit for said motor, pulsating-current supply-terminals for said motor-circuit for supplying said motor-circuit with a direct current having a substantial ripple consisting predominantly of a predetermined alternating-current frequency, a field-weakening shunt including a substantial amount of resistance, a mutual-inductance load-dividing means having two branch-circuits in which the mutual inductance tends to maintain a predetermined division of the alternating-current ripple-component of the current in the motor-circuit, full-field switching-means for at times operating said motor with full field-strength with the two branch-circuits connected together in series with the series main-field winding, and reduced-field switching-means for at other times operating said motor with a reduced field-strength with one of said branch-circuits serially including said series main-field winding and with the other of said branch-circuits serially including said field-weakening shunt and connected in shunt-circuit relation to said series main-field winding.

3. The invention as defined in claim 2, characterized by said reduced-field switching-means including such relative adjustments of the mutual-inductance load-dividing means and the shunt-resistance that the direct-current component and the ripple-component of the current in the motor-circuit divide in approximately equal proportions in the shunt and the series main-field winding.

4. The invention as defined in claim 3, characterized by said shunt including a substantially smaller proportion of inductance to resistance than is present in said series main-field winding under some motor-operating conditions.

5. The invention as defined in claim 3, characterized by said shunt including substantially no reactive impedance.

6. The invention as defined in claim 3, in combination with means for varying the resistance of the field-weakening shunt, and means for substantially simultaneously changing the load-dividing adjustment of the mutual-inductance load-dividing means in such relative proportions as to still maintain approximately proportionate divisions of the direct-current component and the ripple-component of the currents in the field-weakening shunt and the series main-field winding.

LLOYD J. HIBBARD.

No references cited.